(12) United States Patent
Batzakis et al.

(10) Patent No.: US 11,760,506 B2
(45) Date of Patent: Sep. 19, 2023

(54) ASSEMBLY JIG WITH FLEXIBLE FLOOR INTERFACE

(71) Applicant: The Boeing Company, Chicago, IL (US)

(72) Inventors: Nicholas Batzakis, West Melbourne (AU); Andrew S. Currie, West Melbourne (AU)

(73) Assignee: The Boeing Company, Chicago, IL (US)

( * ) Notice: Subject to any disclaimer, the term of this patent is extended or adjusted under 35 U.S.C. 154(b) by 70 days.

(21) Appl. No.: 15/930,789

(22) Filed: May 13, 2020

(65) Prior Publication Data

US 2021/0354853 A1 Nov. 18, 2021

(51) Int. Cl.
*B64F 5/10* (2017.01)
*B23P 19/04* (2006.01)
*B25B 11/02* (2006.01)

(52) U.S. Cl.
CPC .............. *B64F 5/10* (2017.01); *B23P 19/04* (2013.01); *B25B 11/02* (2013.01)

(58) Field of Classification Search
CPC .... B64F 5/10; B64F 5/50; B23P 19/04; B25B 11/02
USPC ...................... 269/17, 58, 59, 901, 909, 910
See application file for complete search history.

(56) References Cited

U.S. PATENT DOCUMENTS

| | | | | |
|---|---|---|---|---|
| 4,761,984 A * | 8/1988 | Fuscaldo, Jr. | ............ | B21D 1/14 72/305 |
| 5,620,192 A * | 4/1997 | Demongin | .............. | B60S 13/00 280/35 |
| 6,823,604 B2 * | 11/2004 | Kato | ........................ | B23Q 3/18 33/549 |
| 7,300,063 B1 * | 11/2007 | Prizmich | ............... | B62B 5/0083 280/47.15 |
| 2013/0241130 A1 * | 9/2013 | Ozu | ......................... | B64F 5/10 269/45 |

* cited by examiner

*Primary Examiner* — Orlando E Aviles
*Assistant Examiner* — J Stephen Taylor
(74) *Attorney, Agent, or Firm* — PARSONS BEHLE & LATIMER

(57) ABSTRACT

Apparatus and methods for an assembly jig are disclosed. The assembly jig includes an elongate support frame that has a first end and a second end, a fixed beam at the second end, transversely oriented to a long axis of the support frame, a pivotable beam at the first end, transversely oriented to the long axis and pivotable in a vertical plane that is substantially perpendicular to the long axis, and a floor contacting transport assembly connected to at least the pivotable beam and configured to enable selective movement of the assembly jig relative to a floor surface.

25 Claims, 5 Drawing Sheets

ASSEMBLY JIG WITH FLEXIBLE FLOOR INTERFACE

FIELD OF THE DISCLOSURE

This disclosure relates generally to floor standing assembly jigs. In particular, this disclosure relates to floor standing assembly jigs for aircraft components that compensate for non-planar floor surfaces.

BACKGROUND

Assembly jigs are used in manufacturing to hold parts together during assembly. Jig index features, or the like, are used to hold the parts within predetermined tolerances. Difficulties in assembly, and beyond, may arise if the assembly jig is contorted or otherwise moved out of its intended orientation and position.

Large assembly jigs, particularly those sized to assemble aircraft components, will tend to sympathetically move with the assembly facility foundation slab movement. This issue can be more pronounced when an assembly jig spans multiple foundation slab segments or is located on a slab that is thin and subject to movement (e.g., assembly facilities and factories close to water subjected to tidal effects or the like). As such, fixed assembly jigs are typically installed on thick concrete slabs (>400 mm) with no expansion joints and containing steel reinforcements to keep them planar. This is to ensure that the floor interface remains flat to avoid the jig twisting. Such a slab can be expensive to install and may not be possible at all assembly facility locations.

Further, as assembly facilities are repurposed, or reconfigured, or when new aircraft or components are developed or old ones phased out, it may be necessary to reconfigure the building foundation to accept jigs of a new size or configuration driving facility expenses and costs. This is particularly a problem with longer jigs and, typically, drives the use of larger and larger slabs to avoid spanning multiple slabs.

For portable assembly jigs that need to travel across the slabs the issues are further complicated. Typically, a solution for portable assembly jigs is usually to move the jigs on air pads or tracks that can accommodate any slab transitions or non-planar features. Typically, most air pads consume large amounts of air and are noisy.

Further, conventional travelling jigs usually require a "dock" of resting points that are controlled in planar orientation and/or contain resting pads that act to "straighten" the jig when docked. This can also add to the manufacturing costs and inefficiencies.

SUMMARY

Disclosed embodiments include assembly jigs that can be used on, and travel over, a non-planar floor by decoupling the jig "picture frame" that holds the critical jig index features to tight tolerances from the jig floor contacting transport assembly. Disclosed embodiments also have the benefit of not requiring floor remodels or complex foundation works to accept the assembly jig, maintaining its accuracy when spanning multiple slabs, or locate it on slabs that are thin and subject to movement.

Disclosed embodiments include an assembly jig having an elongate support frame that comprises a first end and a second end, a fixed beam at the second end, transversely oriented to a long axis of the support frame, a pivotable beam at the first end, transversely oriented to the long axis and pivotable in a vertical plane that is substantially perpendicular to the long axis, and a floor contacting transport assembly connected to at least the pivotable beam and configured to enable selective movement of the assembly jig relative to a floor surface.

Disclosed embodiments of the assembly jig may also include a connection assembly configured to define a range of pivot angles for the pivotable beam. In further disclosed embodiments, the connection assembly may include a stop assembly, a receiver bracket connected to the first end of the support frame, a bushing in the pivotable beam sized to fit inside the receiver bracket, and a king pin that passes through the receiver bracket and the bushing to pivotably secure the pivotable beam to the first end of the support frame.

In still further disclosed embodiments, the stop assembly is configured to limit the range of pivot angles of the pivotable beam. In some embodiments the range of pivot angles of the pivotable beam is based upon floor conditions and may be substantially +/−5° from horizontal, +/−1.5° from horizontal, or +/−1° from horizontal.

In some disclosed embodiments, the floor contacting transport assembly may have at least one caster wheel.

Also disclosed are methods of positioning an aircraft assembly jig. Disclosed methods include providing at least one end of the aircraft assembly jig with a pivoting beam that is pivotable in a vertical plane transverse to a long axis of the assembly jig, the pivoting beam comprising a floor contacting transportation assembly, moving the aircraft assembly over a floor, and allowing the pivoting beam to pivot as the aircraft assembly jig moves over the floor.

In some disclosed embodiments the method includes limiting a pivot angle of the pivoting beam. In further disclosed embodiments the pivot angle is based upon floor conditions and may be substantially +/−5° from horizontal, +/−1.5° from horizontal, or +/−1° from horizontal.

In some disclosed embodiments, the method may include providing a connection assembly configured to define a range of pivot angles for the pivoting beam. In further disclosed embodiments, the method includes providing a stop assembly, providing a receiver bracket connected to the at least one end of the aircraft assembly jig, providing a bushing in the pivoting beam sized to fit inside the receiver bracket, and providing a king pin that passes through the receiver bracket and the bushing to pivotably secure the pivoting beam to the at least one end of the aircraft assembly jig.

In some embodiments the method may include configuring the stop assembly to limit a pivot angle of the pivoting beam. In further disclosed embodiments, the pivot angle is based upon floor conditions and may be substantially +/−5° from horizontal, +/−1.5° from horizontal, or +/−1° from horizontal.

In some disclosed embodiments the method may include providing at least one caster wheel for the floor contacting transport assembly.

Disclosed embodiments also include aircraft assembly jigs including a support frame capable of supporting an aircraft component during assembly of the aircraft component, the support frame having a first end and a second end, two rigidly coupled floor-contacting support points on either side of the support frame at the first end, and two pivotably coupled floor-contacting support points on either side of the support frame on the second end.

In some disclosed embodiments the two rigidly coupled floor-contacting support points are mounted to a stationary beam.

In some disclosed embodiments the two pivotably coupled floor-contacting support points are mounted to a pivoting beam.

Further disclosed embodiments of aircraft assembly jigs may include a connection assembly connected to the pivoting beam and having a receiver bracket connected to the second end of the support frame, a bushing in the pivoting beam sized to fit inside the receiver bracket, and a king pin that passes through the receiver bracket and the bushing to pivotably secure the pivoting beam to the second end of the support frame.

In some embodiments the aircraft assembly jigs may include a stop assembly on one of the pivoting beam or the connection assembly that limits a pivot angle of the pivoting beam.

In some embodiments the two pivotably coupled floor-contacting support points include at least one caster wheel. Other embodiments are also disclosed.

Figure 1:
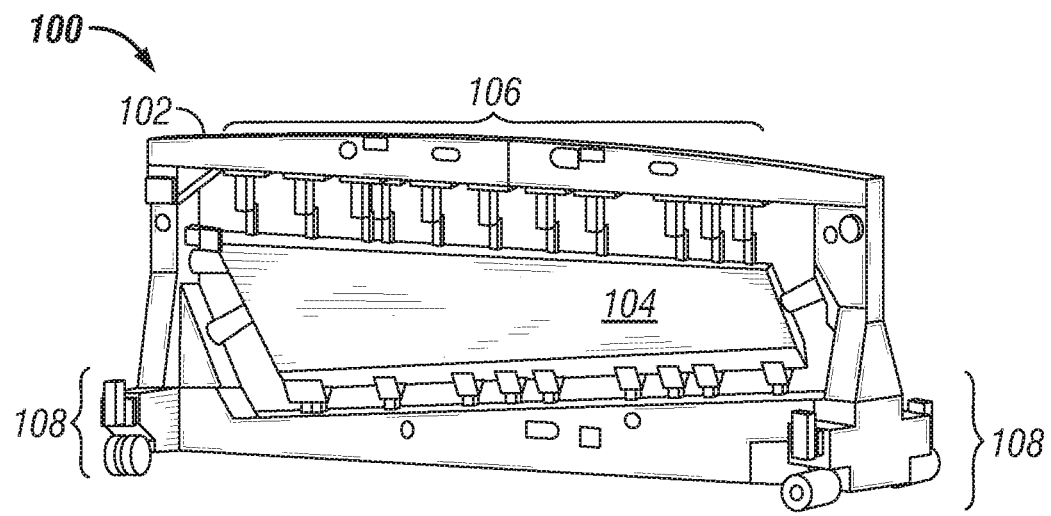
FIG. 1 is an example of a prior art travelling assembly jig.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

FIG. 1 is an example of a prior art travelling assembly jig 100. As discussed above, typical travelling assembly jigs 100 may include a support frame 102, also referred to as a "picture frame," for supporting a part 104 (as an example an aileron is shown) during assembly or other manufacturing or repair processes. The part 104 may be held to desired tolerances by a number of fixtures 106 of various types and functions as would be apparent to those of ordinary skill in the art having the benefit of this disclosure. As also indicated the assembly jig 100 may include a number of floor contacting transport assemblies 108 which typically are rigid and can include various wheels, legs, air pads, docking parts, or track traversing parts to move the jig 100 and hold it in fixed position.

Figure 2:
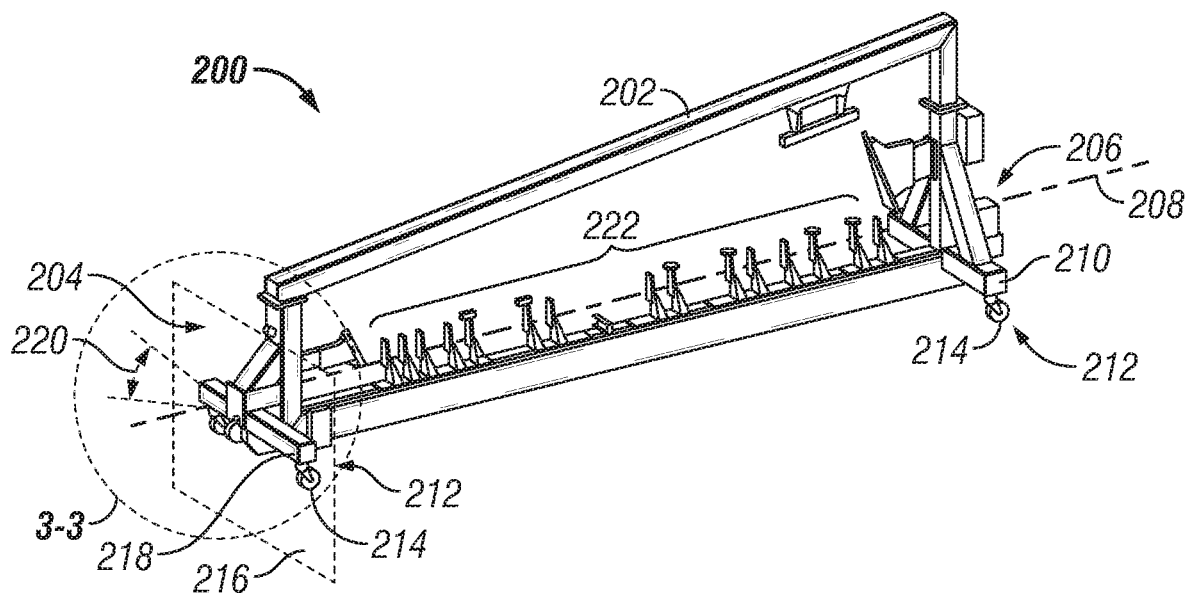
FIG. 2 is an example of a travelling assembly jig in accordance with disclosed embodiments.

FIG. 2 is an example of a travelling assembly jig 200 in accordance with disclosed embodiments. As illustrated, embodiments of assembly jig 200 include an elongate support frame 202. Support frame 202 may be of any suitable shape and size according to, among other things, the intended part to be assembled, the particular assembly facility used, the floor conditions, or the like. For embodiments of assembly jig 200 that include an elongate support frame 202 there is generally a first end 204 and a second end 206 along a long axis 208.

At the second end 206 of the support frame 202 is a fixed beam 210 for supporting at least a portion of floor contacting transport assembly 212. As shown in FIG. 2, embodiments of assembly jig 200 may have fixed beam 210 oriented substantially transverse to long axis 208. Other orientations are also possible. Floor contacting transport assembly 212 may include any suitable wheels, rollers, legs, track followers, or the like, such as caster wheel 214 as shown.

At the first end 204 of the support frame 202 is a pivotable beam 218 for supporting at least a portion of floor contacting transport assembly 212. As shown in FIG. 2, embodiments of assembly jig 200 may have pivotable beam 218 oriented substantially transverse to long axis 208. Other orientations are also possible. Floor contacting transport assembly 212 may include any suitable wheels, rollers, legs, track followers, or the like such as caster wheel 214 as shown.

As indicated schematically in FIG. 2, pivotable beam 218 is pivotable in a vertical plane 216 that is substantially perpendicular to long axis 208. As also shown schematically (and not to scale), pivotable beam 218 may pivot for a predetermined range of pivot angles 220. As a non-limiting example, pivotable beam 218 may allow a range of pivot angles 220 of at least +/−5° from horizontal, or in some embodiments +/−1.5° from horizontal, or +/−1° from horizontal to accommodate floor conditions. Again, the amount of pivot depends on, among other things, the quality of the floor, the length of the beam 218, the span (e.g., along axis 208) of the assembly jig 200, and the like.

As one of ordinary skill in the art having the benefit of this disclosure would also understand, embodiments of assembly jig 200 will also include various fixtures 222 of various types for a variety of functions.

As a non-limiting example, jig 200 may be sized for supporting an aileron and may span 390" from first end 204 to second end 206, and may be 135" tall with pivotable beam 218 being 95" long. The entire jig 200 may weigh approximately 14,500 lbs. Of course, those of ordinary skill in the art having the benefit of this disclosure would understand that the disclosed concepts are extendible to a wide variety of sizes, including different sizes for other aircraft parts. Generally, the disclosed concepts have no limitation to size, although larger spans may require increased stiffness of the base beam of support frame 202 and that can drive increased weight of the assembly.

Figure 3:
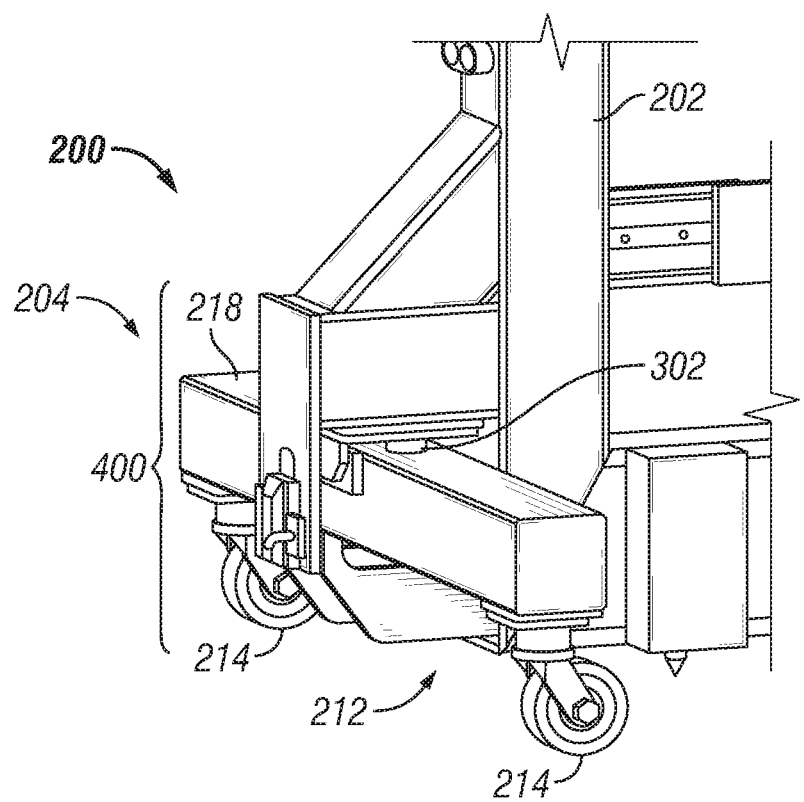
FIG. 3 is a close-up view of a first end of the travelling assembly jig shown in region 3-3 of FIG. 2 in accordance with disclosed embodiments.

FIG. 3 is a close-up view of a first end 204 of the travelling assembly jig 200, and more specifically of the portion shown in region 3-3 of FIG. 2, in accordance with disclosed embodiments. As indicated in FIG. 3, a connection assembly 400 is used to connect the pivoting beam 218 to the assembly jig 200 at the first end 204. A stop assembly 302 may be included on any of pivoting beam 218, support frame 202, portions of connection assembly 400, or combinations of the foregoing as would be understood by persons of ordinary skill having the benefit of this disclosure. Stop assembly 302 may be fixed or adjustable and is used to limit the range of pivot angles 220 that pivotable beam 218 may move through.

Figure 4A:
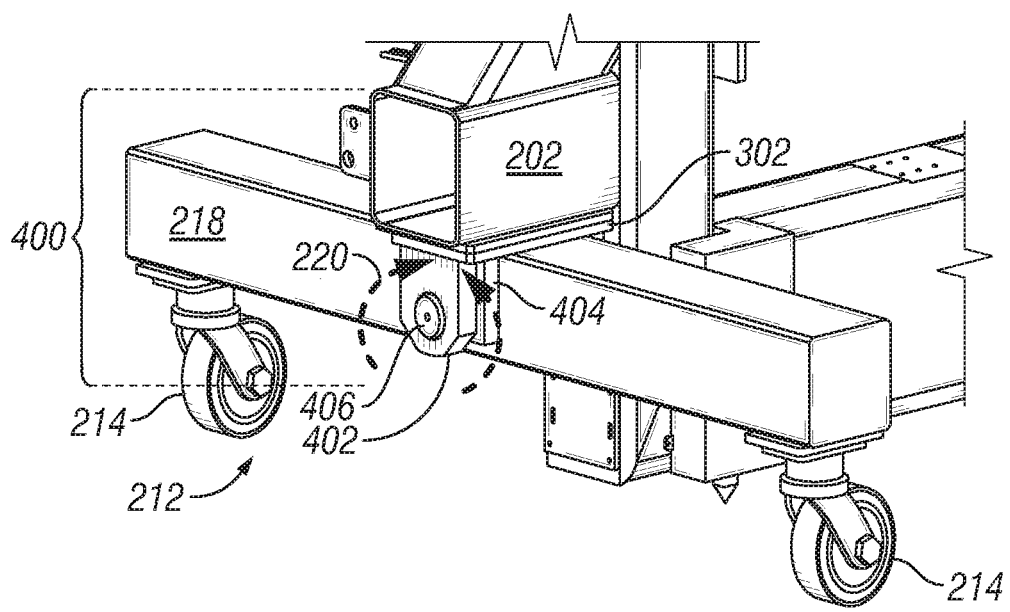
FIG. 4A is a close-up view of an exemplary connection assembly in accordance with disclosed embodiments.

FIG. 4A is a close-up view of an exemplary connection assembly 400 in accordance with disclosed embodiments. FIG. 4A shows a configuration similar to the view shown in FIG. 3, but with certain structure and components that are visible in FIG. 3 not shown in FIG. 4A, for ease of explanation. As shown, embodiments of the connection assembly can include a receiver bracket 402 connected to a portion of the support frame 202. For these embodiments a bushing 404 may be connected to the pivotable beam 218 and a king pin 406 inserted through the receiver bracket 402 and bushing 404 to provide pivotable mounting of the pivotable beam 218. In some embodiments, a predetermined edge or width of the receiver bracket 402 may function as part of the stop assembly 302 to limit the range of pivot angles 220 through which the pivotable beam 218 may move.

Figure 4B:
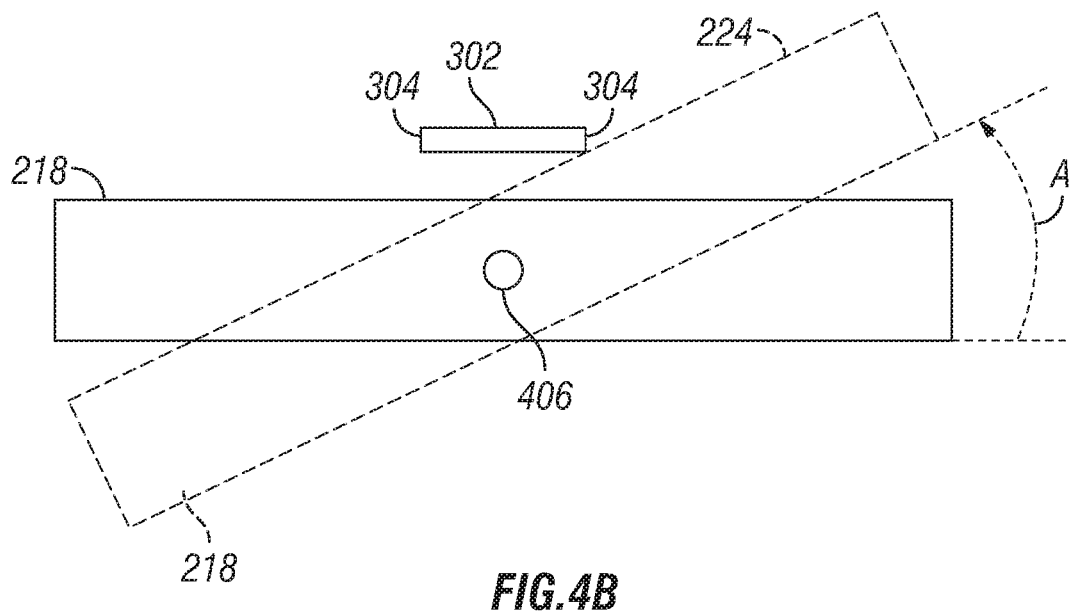
FIG. 4B shows a simplified, schematic (not to scale) view of one manner in which certain components of the connection assembly shown in FIG. 4A move relative to each other in accordance with disclosed embodiments.

For example, FIG. 4B shows a simplified, schematic (not to scale) view of beam 218 relative to stop assembly 302, which in this embodiment takes the form of a flat bar disposed beneath support frame 202 (not shown), with the width stop assembly defined by edges 304. As noted above, beam 218 can pivot relative to the travelling jig assembly, of which stop assembly 302 is a part, about king pin 406. A pivoted version of beam 218 is shown in dashed structure, at the point where the extent of the pivot of the beam indicated by the directional arrow A is stopped by stop assembly 302, and specifically when a top surface 224 of beam 218 engages edge 304 of stop assembly 302. The opposite edge of stop assembly 302 is similarly situated to limit pivoting of the beam in the other direction (e.g., opposite to that indicated by arrow A). Accordingly, in similar embodiments, varying the width of stop assembly 302—i.e., the distance between edges 304—may correspondingly vary the range of pivot angles of pivotable beam 218. In other embodiments, however, stop assembly 302 may take a variety of other forms, and may including any suitable configuration(s) and/or feature(s) adapted to limit the range of pivoting of the beam 218. Likewise, as would be apparent to those of ordinary skill in the art having the benefit of this disclosure, stop assembly 302 limits the free pivot in order to engage the outside wheel (e.g., 214) in a toppling condition where the outside wheel (e.g., 214) reacts to that toppling moment. The clearance and therefore the rotation (e.g., arrow A in FIG. 4B) prior to engaging the edge 304 of stop assembly 302 can be customized to specific needs, can be asymmetric (i.e., pivot more on one side than the other), or the like, as floor conditions, jig type, or the like, dictate.

Figure 5:
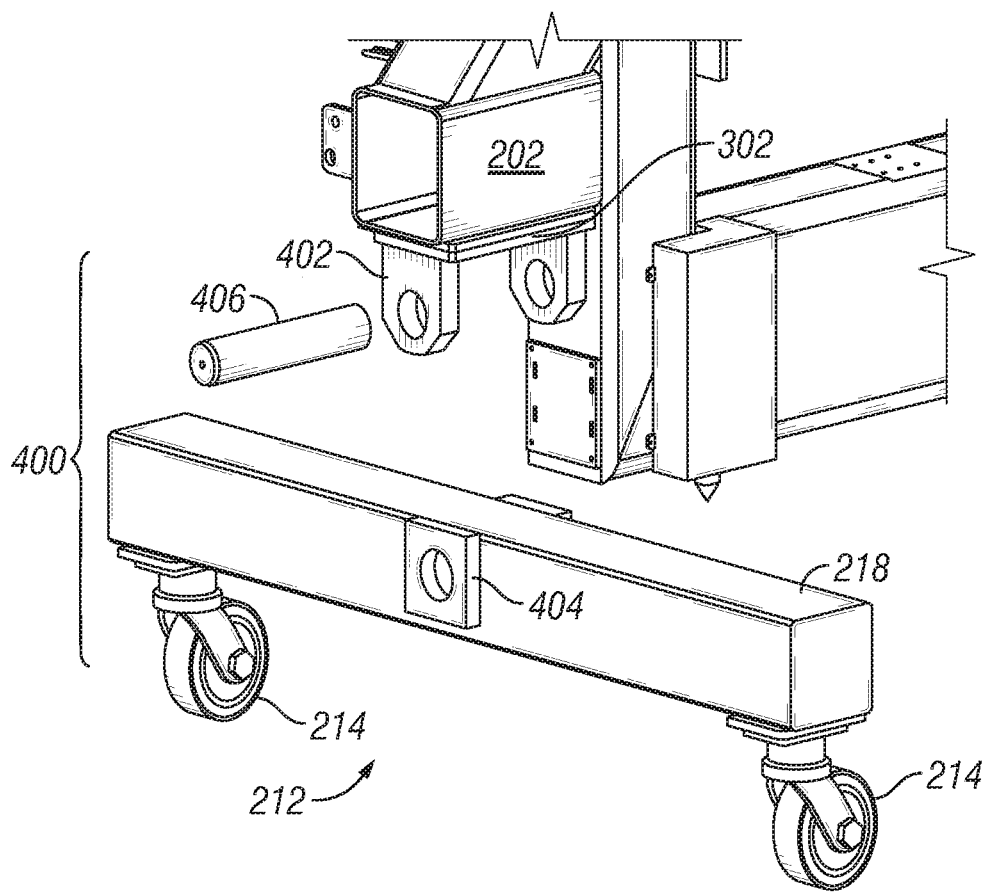
FIG. 5 is an exploded view of the connection assembly of FIG. 4A in accordance with disclosed embodiments.

FIG. 5 is an exploded view of the connection assembly 400 of FIG. 4A in accordance with disclosed embodiments. Of course, variations for the connection assembly 400, such as reversal of mounting locations for components, or the like, would be apparent to those of ordinary skill in the art having the benefit of this disclosure.

Figure 6A:
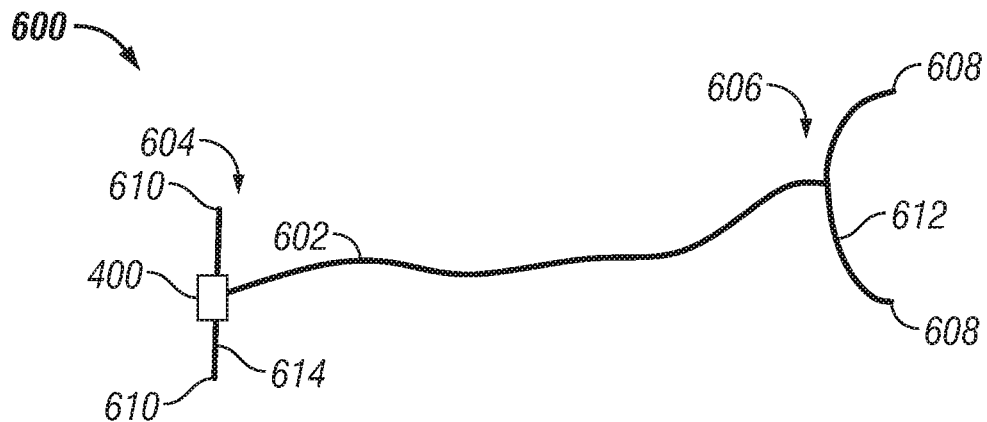
FIGS. 6A-C are schematic top-down views of travelling assembly jigs in accordance with disclosed embodiments.
Figure 6B:
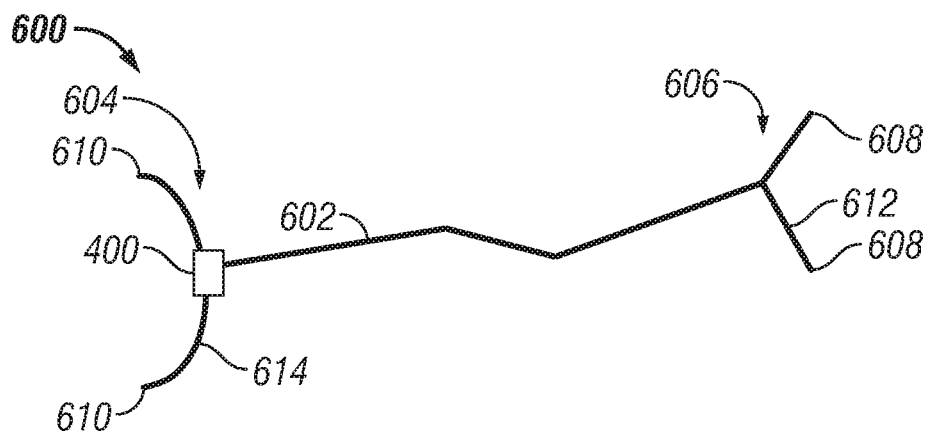
Figure 6C:
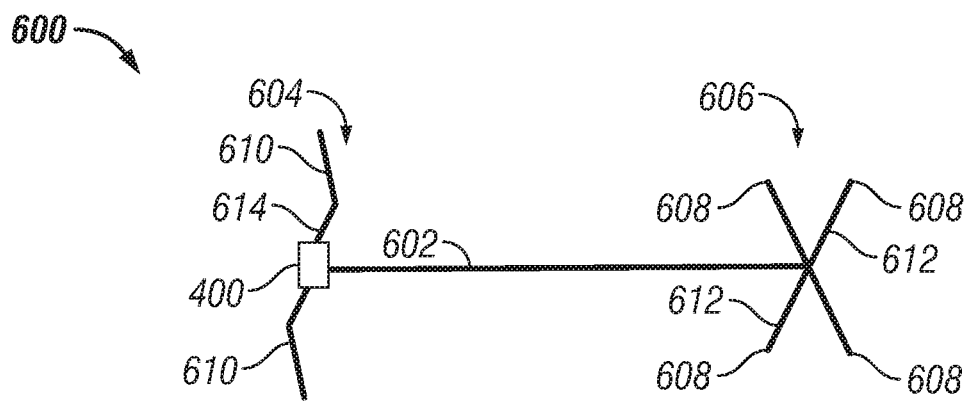

FIGS. 6A-C are schematic top-down views of travelling aircraft assembly jigs 600 in accordance with disclosed embodiments. As shown in these examples, support frame 602 may take shapes other than linear (e.g., FIG. 6A-B). Typically, support frame 602 will have a first end 604 and a second end 606. At one of the ends (604, 606) will be a number of rigidly coupled floor-contacting support points 608. The rigidly coupled floor-contacting support points 608 may be mounted on one or more rigid beams 612. At the other of the ends (604, 606) will be a number of pivotably coupled floor contacting support point 610. The pivotably coupled floor-contacting support points 610 may be mounted on one or more pivotable beams 614. As indicated in FIGS. 6A-C, beams 612, 614 may also have a variety of shapes and configurations. A connection assembly 400 is used to pivotably couple the pivotably coupled floor-contacting support points, and any pivotable beams 614 to the support frame 602 as disclosed herein.

Figure 7:
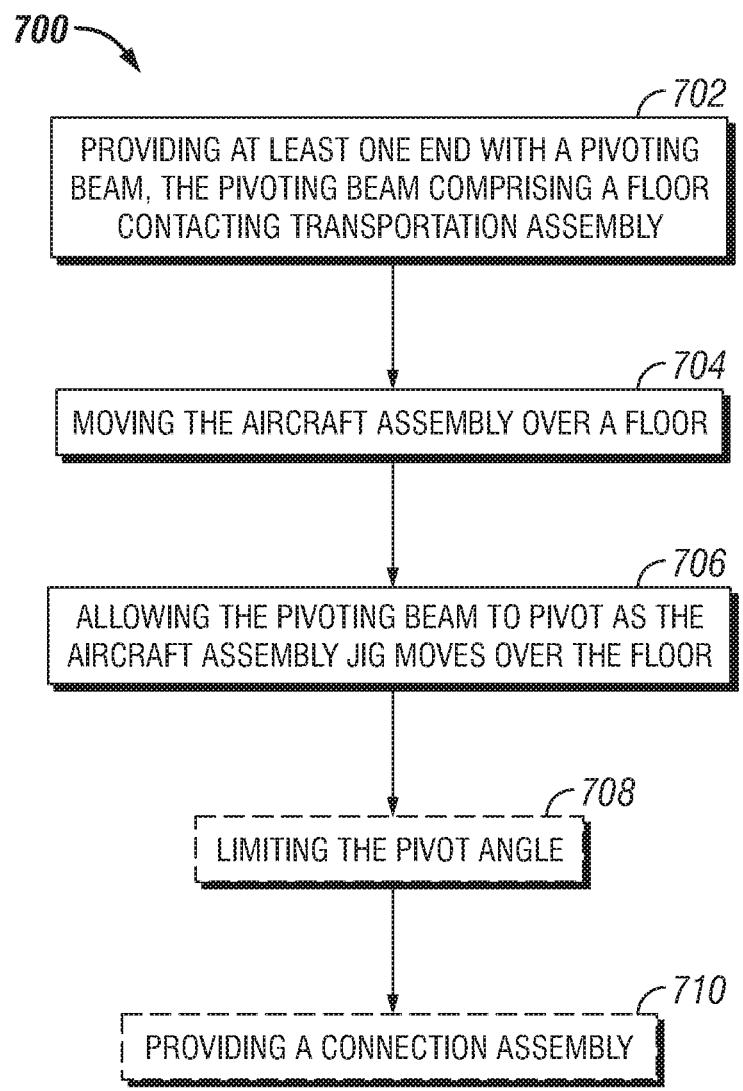
FIG. 7 is an exemplary flow chart of methods of positioning an aircraft assembly jig in accordance with disclosed embodiments.

FIG. 7 is an exemplary flow chart of methods 700 of positioning an aircraft assembly jig (e.g., 600) in accordance with disclosed embodiments. As shown, methods 700 may initiate at 702 by providing at least one end of the aircraft assembly jig (e.g., 600) with a pivoting beam (e.g., 614) that is pivotable in a vertical plane (e.g., 216) transverse to a long axis (e.g., 208) of the assembly jig, the pivoting beam comprising a floor contacting transportation assembly (e.g., 212). Methods 700 also include at 704 moving the aircraft assembly over a floor, and, at 706 allowing the pivoting beam to pivot as the aircraft assembly jig moves over the floor.

As indicated at 708, some embodiments of methods 700 may optionally include limiting a pivot angle of the pivoting beam and limiting the pivot angle based upon floor conditions.

As indicated at 710, some embodiments of methods 700 may optionally include providing a connection assembly (e.g., 400) configured to define a range of pivot angles for the pivoting beam. In some embodiments as disclosed herein, methods 700 may include providing a connection assembly by providing a stop assembly (e.g., 302), providing a receiver bracket (e.g., 402) connected to the at least one end of the aircraft assembly jig, providing a bushing (e.g., 404) in the pivoting beam sized to fit inside the receiver bracket, and providing a king pin (e.g., 406) that passes through the receiver bracket and the bushing to pivotably secure the pivoting beam to the at least one end of the aircraft assembly jig. In some embodiments, methods 700 may include configuring the stop assembly to limit a pivot angle of the pivoting beam, and the pivot angle may be limited based upon floor conditions. In some embodiments, the methods 700 may include providing at least one caster wheel (e.g., 214) for the floor contacting transport assembly. Other methods and steps are also possible as a person of ordinary skill in the are having the benefit of this disclosure would comprehend.

Although various embodiments have been shown and described, the present disclosure is not so limited and will be understood to include all such modifications and variations would be apparent to one skilled in the art.

What is claimed is:

1. An assembly jig comprising:
    an elongate support frame that comprises a first end and a second end;
    a non-pivoting, fixed beam at the second end, transversely oriented to a long axis of the support frame and directly connected to a first floor contacting transport assembly that is non-pivoting in a vertical plane that is substantially perpendicular to the long axis and is configured to enable selective movement of the assembly jig relative to a floor surface;
    a pivotable beam at the first end, transversely oriented to the long axis and pivotable in the vertical plane that is substantially perpendicular to the long axis; and
    a second floor contacting transport assembly connected to the pivotable beam and configured to enable selective movement of the assembly jig relative to a floor surface.

2. The assembly jig of claim 1 further comprising a connection assembly configured to define a range of pivot angles for the pivotable beam.

3. The assembly jig of claim 2 wherein the connection assembly comprises:
   a stop assembly;
   a receiver bracket connected to the first end of the support frame;
   a bushing in the pivotable beam sized to fit inside the receiver bracket; and
   a king pin that passes through the receiver bracket and the bushing to pivotably secure the pivotable beam to the first end of the support frame.

4. The assembly jig of claim 3 wherein the stop assembly is configured to limit the range of pivot angles of the pivotable beam.

5. The assembly jig of claim 4 wherein the range of pivot angles of the pivotable beam is substantially +/−5° from horizontal.

6. The assembly jig of claim 4 wherein the range of pivot angles of the pivotable beam is substantially +/−1.5° from horizontal.

7. The assembly jig of claim 4 wherein the range of pivot angles of the pivotable beam is substantially +/−1° from horizontal.

8. The assembly jig of claim 1 wherein the second floor contacting transport assembly comprises at least one caster wheel.

9. A method of positioning an aircraft assembly jig, wherein the assembly jig comprises:
   an elongate support frame that comprises a first end and a second end;
   a non-pivoting, fixed beam at the second end, transversely oriented to a long axis of the support frame and directly connected to a first floor contacting transport assembly that is non-pivoting in a vertical plane that is substantially perpendicular to the long axis; and
   a pivoting beam at the first end, transversely oriented to the long axis and pivotable in the vertical plane that is substantially perpendicular to the long axis, the pivoting beam comprising a second floor contacting transport assembly; and wherein the method comprises:
   moving the aircraft assembly over a floor; and
   allowing the pivoting beam to pivot as the aircraft assembly jig moves over the floor.

10. The method of claim 9 further comprising limiting a pivot angle of the pivoting beam.

11. The method of claim 10 wherein the pivot angle is substantially +/−5° from horizontal.

12. The method of claim 10 wherein the pivot angle is substantially +/−1.5° from horizontal.

13. The method of claim 10 wherein the pivot angle is substantially +/−1° from horizontal.

14. The method of claim 9 further comprising:
   providing a connection assembly configured to define a range of pivot angles for the pivoting beam.

15. The method of claim 14 wherein providing a connection assembly comprises:
   providing a stop assembly;
   providing a receiver bracket connected to at least one end of the aircraft assembly jig;
   providing a bushing in the pivoting beam sized to fit inside the receiver bracket; and
   providing a king pin that passes through the receiver bracket and the bushing to pivotably secure the pivoting beam to the at least one end of the aircraft assembly jig.

16. The method of claim 15 further comprising configuring the stop assembly to limit a pivot angle of the pivoting beam.

17. The method of claim 16 wherein the pivot angle is substantially +/−5° from horizontal.

18. The method of claim 16 wherein the pivot angle is substantially +/−1.5° from horizontal.

19. The method of claim 16 wherein the pivot angle is substantially +/−1° from horizontal.

20. The method of claim 9 further comprising providing at least one caster wheel for the second floor contacting transport assembly.

21. An aircraft assembly jig comprising:
   a support frame having a long axis and capable of supporting an aircraft component during assembly of the aircraft component, the support frame comprising a first end and a second end;
   at least one fixed, non-pivoting beam connected to the support frame and directly connected to two floor-contacting support points on either side of the support frame at the first end that are non-pivoting in a vertical plane that is substantially perpendicular to the long axis; and
   two pivotably coupled floor-contacting support points on either side of the support frame on the second end.

22. The aircraft assembly jig of claim 21 wherein the two pivotably coupled floor-contacting support points are mounted to a pivoting beam.

23. The aircraft assembly jig of claim 22 further comprises:
   a connection assembly connected to the pivoting beam and comprising:
   a receiver bracket connected to the second end of the support frame;
   a bushing in the pivoting beam sized to fit inside the receiver bracket; and
   a king pin that passes through the receiver bracket and the bushing to pivotably secure the pivoting beam to the second end of the support frame.

24. The aircraft assembly jig of claim 23 further comprising:
   a stop assembly on one of the pivoting beam or the connection assembly that limits a pivot angle of the pivoting beam.

25. The aircraft assembly jig of claim 21 wherein the two pivotably coupled floor-contacting support points include at least one caster wheel.

* * * * *